Patented Sept. 18, 1923.

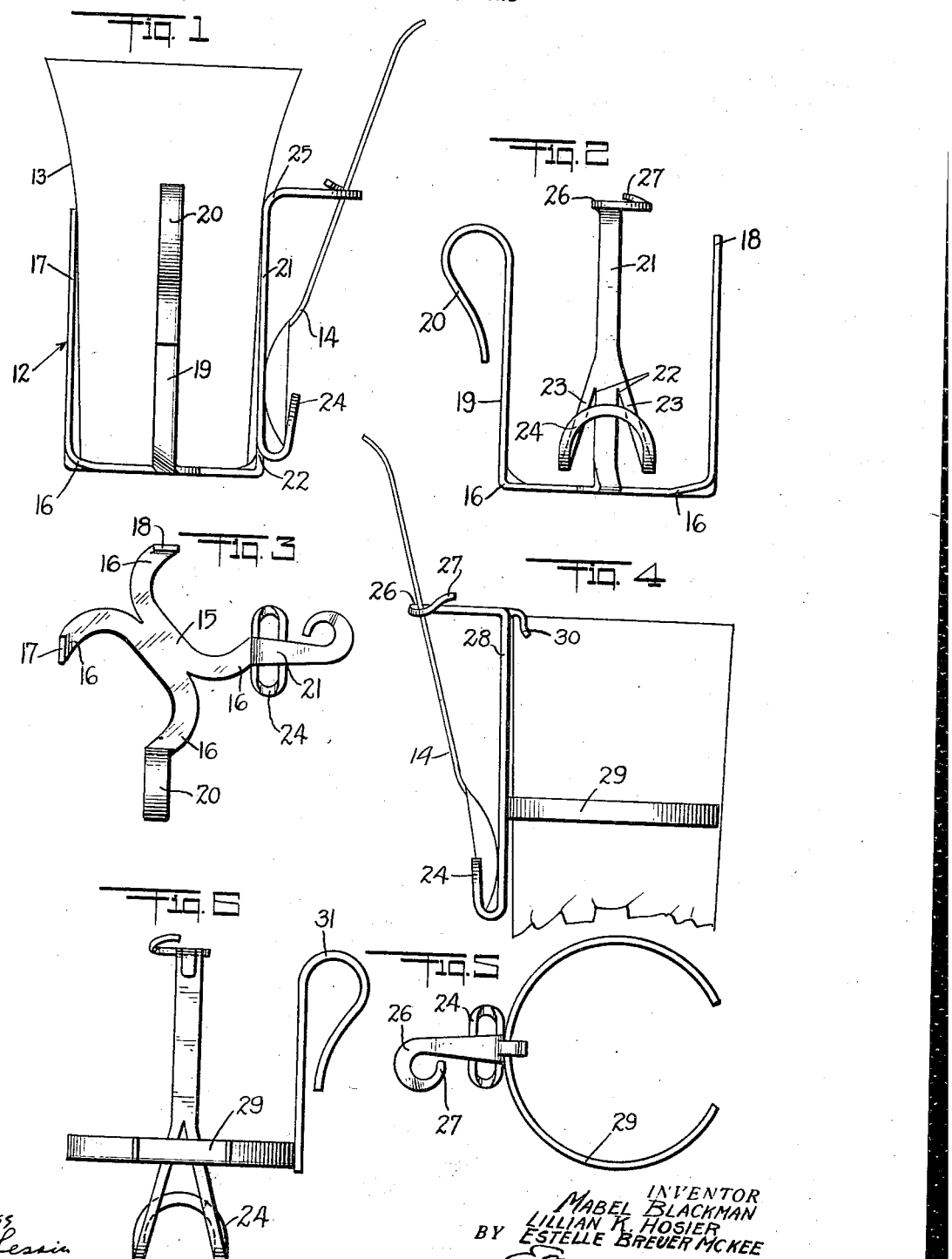

1,468,256

UNITED STATES PATENT OFFICE.

MABEL BLACKMAN, LILLIAN K. HOSIER, AND ESTELLE BREUER McKEE, OF NEW YORK, N. Y.; SAID BLACKMAN ASSIGNOR TO SAID HOSIER AND SAID McKEE.

DRINKING-GLASS HOLDER.

Application filed September 30, 1921. Serial No. 504,520.

*To all whom it may concern:*

Be it known that we, MABEL BLACKMAN, LILLIAN K. HOSIER, and ESTELLE BREUER McKEE, citizens of the United States, and residents of the city, county, and State of New York, have invented certain new and useful Improvements in a Drinking-Glass Holder, of which the following is a specification.

This invention relates to drinking glass containers of the metal type which are used generally in the dispensing of beverages.

An important object of the invention is the provision, in conjunction with the glass container, of a part thereof which is adapted to receive a spoon, and in some forms provide for the use of the spoon itself as a handle.

Another object is to make a glass container of a single piece of metal which when cut and bent to position will have an ornamental appearance, be light in weight and be easily cleaned.

Drawings.

Figure 1 is a view in elevation of the container having therein a glass and spoon.

Figure 2 is a view in elevation of the container and showing more clearly the spoon retaining portion thereof.

Figure 3 is is a top plan view showing how the bottom of the container is formed.

Figure 4 is a modified form of container wherein use is made of a gripping element that engages the glass, and a spoon receiving portion attached thereto.

Figure 5 is a top plan view of the container as shown in Figure 4.

Figure 6 is a view in elevation of the container as shown in Figure 4, with a handle provided thereon.

Description.

Referring more particularly to the drawings, 12 denotes generally a glass container, having disposed thereon the glass 13 and spoon 14.

The container 12 is preferably constructed of flat metal so cut and bent as to form a bottom 15 having extensions 16 which form the oppositely disposed upstanding members which engage the glass, and in one of which provision is made for the reception of the spoon 14.

The members 17 and 18 extend upwardly about two thirds the length of the glass and are squared at the top. A like member 19 disposed opposite to the member 18 is bent to form a handle 20 at the upper end thereof with which the container may be carried.

Another member 21 disposed opposite to the member 17 is bent upwardly and cut as at 22 to form the two distended portions 23 which are bent back upon themselves and joined to form a semicircular spoon ladle engaging portion 24. The upper end of the member 21 is bent as at 25 and extends horizontally outward to terminate in a circular hook portion 26, the tapered end 27 of which is above and a little to the side of the horizontally disposed part.

The spoon can only be inserted into the hook by being held at an angle that will allow the thickness of the handle to pass under the end 27. When the ladle portion of the spoon is in the member 24 the handle of the spoon cannot become disengaged from within the hook 26.

In the modification illustrated in Fig. 4 use is made of a single piece 28 similar to the member 21, which has attached thereto a glass encompassing clamp 29 and a hook 30 which is adapted to extend over the rim of the glass.

When the spoon is in position as shown in Fig. 4 the same forms a handle by means of which the glass may be held.

In Figure 6 is shown a handle 31 attached to the clamp 29, whereby the device will be lifted by the handle 31 alone, and regardless of the spoon being in position on the device or not.

It is to be understood that the container may be provided with spring members which will have a tendency to grip the side of the glass at four points, so that unnecessary rattle will be eliminated. The container provides also for a sanitary means of supporting the spoon before and after use.

Claims.

1. A cup holder comprising a supporting member, an upstanding arm carried at one side of said supporting member, a laterally offset hook formed at the upper end of said arm and adapted to engage the handle portion of a spoon, and a bracket formed at the lower end of said arm for receiving the bowl portion of the spoon, the portion of the spoon extending between said hook and said bracket being adapted for use as a handle for the holder.

2. A cup holder comprising a resilient cup supporting member, an upstanding arm carried at one side of said supporting member, a laterally offset hook formed at the upper end of said arm and adapted to engage the handle portion of a spoon, and a bracket formed at the lower end of said arm for receiving the bowl portion of the spoon, the handle portion of the spoon being disposed in spaced and upwardly inclined relation with respect to said arm and that portion of the same extending between said hook and said bracket being adapted for use as a handle for the holder.

3. A receptacle container comprising a bottom portion adapted to support thereon a receptacle and including upstanding arms, one of said arms having its lower end portion provided with means for receiving the bowl end of a spoon, the upper end portion of said arm being provided with means for engaging the handle portion of the spoon when the bowl portion thereof is resting in the said first mentioned means.

MABEL BLACKMAN.
LILLIAN K. HOSIER.
ESTELLE BREUER McKEE.